US009368788B2

(12) United States Patent
Ogg et al.

(10) Patent No.: US 9,368,788 B2
(45) Date of Patent: *Jun. 14, 2016

(54) LAYERED IRON ELECTRODE

(71) Applicant: Encell Technology, Inc., Alachua, FL (US)

(72) Inventors: Randy Gene Ogg, Newberry, FL (US); Craig Hinton Welch, Sarasota, FL (US)

(73) Assignee: ENCELL TECHNOLOGY, INC., Alachua, FL (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/169,405

(22) Filed: Jan. 31, 2014

(65) Prior Publication Data

US 2014/0220433 A1    Aug. 7, 2014

Related U.S. Application Data

(60) Provisional application No. 61/759,777, filed on Feb. 1, 2013, provisional application No. 61/902,041, filed on Nov. 8, 2013.

(51) Int. Cl.
| | |
|---|---|
| *H01M 4/04* | (2006.01) |
| *H01M 4/24* | (2006.01) |
| *H01M 4/26* | (2006.01) |
| *H01M 4/38* | (2006.01) |
| *H01M 4/52* | (2010.01) |
| *H01M 4/62* | (2006.01) |
| *H01M 10/30* | (2006.01) |
| *H01M 4/32* | (2006.01) |
| *H01M 4/36* | (2006.01) |
| *H01M 4/66* | (2006.01) |

(Continued)

(52) U.S. Cl.
CPC ............ *H01M 4/248* (2013.01); *H01M 4/0404* (2013.01); *H01M 4/32* (2013.01); *H01M 4/366* (2013.01); *H01M 4/62* (2013.01); *H01M 4/622* (2013.01); *H01M 4/661* (2013.01); *H01M 4/74* (2013.01); *H01M 10/30* (2013.01); *H01M 2004/021* (2013.01); *Y02E 60/124* (2013.01)

(58) Field of Classification Search
CPC ... H01M 4/248; H01M 4/0404; H01M 4/622; H01M 4/32; H01M 4/366; H01M 4/661; H01M 4/74; H01M 4/62; H01M 10/24; H01M 2004/021; Y02E 60/124

See application file for complete search history.

(56) References Cited

U.S. PATENT DOCUMENTS

| | | |
|---|---|---|
| 3,630,781 A | 12/1971 | Rampel |
| 4,021,911 A | 5/1977 | Kononenko et al. |

(Continued)

OTHER PUBLICATIONS

International Search Report from Corresponding Application No. PCT/US14/14028 mailed May 21, 2014.

*Primary Examiner* — Brittany Raymond

(74) *Attorney, Agent, or Firm* — E. Joseph Gess; Melissa M. Hayworth; Mary R. Bram

(57) ABSTRACT

The present invention provides one with a novel coated iron electrode. Provided is an iron based electrode comprising a single layer conductive substrate coated on at least one side with a multilayered coating, with each coating layer comprising an iron active material, and preferably a binder. The coating is comprised of at least two layers. Each layer has at least a different porosity or composition than an adjacent layer. The iron based electrode is useful in alkaline rechargeable batteries, particularly as a negative electrode in a Ni—Fe battery.

24 Claims, 4 Drawing Sheets

(51) Int. Cl.
*H01M 4/74* (2006.01)
*H01M 4/02* (2006.01)

(56) References Cited

U.S. PATENT DOCUMENTS

| | | |
|---|---|---|
| 4,216,045 A | 8/1980 | Morioka |
| 5,780,184 A | 7/1998 | Coco et al. |
| 2008/0057403 A1 | 3/2008 | Issaev et al. |
| 2011/0039159 A1* | 2/2011 | Ryu ................... H01M 4/364 429/223 |
| 2012/0070746 A1* | 3/2012 | Mikhaylik .......... H01M 2/1673 429/231.95 |
| 2012/0328942 A1* | 12/2012 | Thomas-Alyea ..... H01M 4/587 429/211 |

* cited by examiner

Active material

LAYERED IRON ELECTRODE

CROSS REFERENCE TO RELATED APPLICATIONS

This application claims priority to U.S. Provisional Application Ser. No. 61/759,777, filed Feb. 1, 2013; and U.S. Provisional Application Ser. No. 61/902,041, filed Nov. 8, 2013, which applications are incorporated herein by reference in their entirety.

BACKGROUND OF THE INVENTION

1. Field of the Invention

The present invention is in the technical field of energy storage devices. More particularly, the present invention is in the technical field of rechargeable batteries employing an iron electrode of a specific design.

2. State of the Art

Iron electrodes have been used in energy storage batteries and other devices for over one hundred years. In particular, iron electrodes are often combined with a nickel-based positive electrode in alkaline electrolyte to form a nickel-iron (Ni—Fe) battery. The Ni—Fe battery is a rechargeable battery having a nickel(III)oxy-hydroxide positive electrode in combination with an iron negative electrode with an alkaline electrolyte such as potassium hydroxide.

The Ni—Fe battery is a very robust battery which is very tolerant of abuse such as overcharge and overdischarge and can have a very long life. It is often used in backup situations where it can be continuously trickle-charged and last more than 20 years.

Traditionally, the iron electrode active material is produced by dissolving pure iron powder in sulfuric acid, followed by drying and roasting to produce iron oxide ($Fe_2O_3$). The material is washed and partially reduced in hydrogen and partially oxidized to give a mix of Fe and magnetite ($Fe_3O_4$). Additives such as FeS may be added to the active material mass. The negative electrode structure is typically that of a pocket plate construction wherein the active material is introduced into the current collector. The current collector is made up of steel strips or ribbons that are perforated and nickel plated and the strip formed into a tube or pocket with one end left open for introduction of the active material (D. Linden and T. Reddy, Editors, "Handbook of Batteries, Third Edition", McGraw-Hill, ©2002). Alternatively, fine iron powder can be sintered under a reducing atmosphere to yield a sturdy electrode shape.

In current pocket electrode designs, the substrate encompasses the active material and holds the material between two layers of conductor, therefore requiring two substrates per electrode. In this process, pockets are formed by interlocking two perforated Ni-coated strips into which the active material is compressed. While such a design offers long life, the energy density is poor and the process is not amenable to low-cost manufacturing methods.

An alternative process utilizes a porous sintered structure of iron powder, which is filled with iron hydroxide by either an electrochemical process or by impregnation of the pores with an appropriate iron salt, followed by immersion in alkaline solution. Such electrodes suffer from poor active material loading and corrosion of the iron porous plaque during impregnation, leading to limited life.

To address these short-comings, U.S. Pat. No. 4,236,927 describes a process whereby iron powder and a reducible iron compound are mixed together and sintered into a stable body. This mixture is then sintered at high temperature to form a plate of desired shape. While this eliminates the need for a sintered plaque substrate or pockets of Ni-coated steel, it requires high temperature sintering under hydrogen atmosphere. Such processes add considerable complexity and cost in volume manufacturing.

These methods for producing iron electrodes are expensive, lead to low active material utilization, and poor specific energy. As a result, Ni—Fe batteries have largely been displaced by other battery technologies due to the high cost of manufacturing and low specific energy. While the technology of preparing iron electrodes is well known and the current preferred process for making these electrodes is a pocket design, pocket design electrodes are not cost effective and are complex in manufacturing. Although the theoretical capacity of an iron electrode is high, in practice only a small percentage of this is achieved due to the poor conductivity of iron oxide. In a pocket electrode design, loss of contact to the external matrix surface results in increased polarization and a drop in cell voltage. To avoid this, large amounts of conductive material such as graphite must be added to the active material, further increasing cost and lowering energy density. The industry would be well served by a low cost, high quality and high performance iron electrode design.

Other forms of electrode production are known in the art, particularly electrodes of a pasted construction. This type of electrode typically incorporates a binder with the active material, which can then be coated onto a two or three dimensional current collector, dried, and compacted to form the finished electrode.

U.S. Pat. No. 3,853,624 describes a Ni—Fe battery incorporating iron electrodes employing a metal fiber structure which is loaded with sulfurized magnetic iron oxide by a wet pasting method. The plates are electrochemically formed outside the cell to electrochemically attach the iron active material to the plaque structure. Such a process is unwieldy in high volume manufacturing and adds to product cost.

U.S. Pat. No. 4,021,911 describes an iron electrode wherein the iron active mass is spread onto a grid, rolled, and dried. The electrode is then treated with an epoxide resin solution to form a solid reinforcing film-like layer on the electrode surface. However, it can be expected that such a surface film would contribute to an insulating nature to the electrode surface, significantly increasing charge transfer resistance and lowering the cell's ability to sustain high charge and/or discharge rates.

Similarly, PTFE has been proposed as a binder system for paste type electrodes for alkaline batteries. U.S. Pat. No. 3,630,781 describes the use of a PTFE aqueous suspension as a binder system for rechargeable battery electrodes. However, to maintain the PTFE powder in suspension, it is necessary to add surfactants to the suspension, which must be removed from the resultant electrode by extensive washing, adding cost and complexity to the manufacturing process. An alternative approach for a PTFE-bonded electrode is described in U.S. Pat. No. 4,216,045 using fluorocarbon resin powder to form a sheet which can be attached to a conductive body. However, the use of PTFE results in a water-repellent surface, which while beneficial in a recombinant battery such as NiCd or NiMH, is detrimental to the performance of a flooded Ni—Fe battery where good contact between the electrode and electrolyte is beneficial.

Pasted electrodes using various binders have been proposed for alkaline electrodes, most particularly for electrodes employing hydrogen-absorbing alloys for NiMH batteries (for example U.S. Pat. No. 5,780,184). However, the desired properties for these electrodes differ significantly from those desired for a high capacity iron electrode. In the case of the MH electrode, high electrode density (low porosity) is required to maintain good electrical contact between the alloy particles and to facilitate solid-state hydrogen diffusion in the alloy.

In contrast to hydrogen-absorbing alloys employed as electrodes for NiMH batteries, high porosity and surface area is desirable near the surface of iron electrodes. Higher surface area of the outer area of the electrode should promote better utilization of active material due to the low solubility and electrically insulating properties of the iron oxide species. High porosity allows improved gas migration out of electrode pores compared electrodes with low porosity. Hence, binder systems developed for other types of alkaline electrodes have not been optimized for Ni—Fe batteries and hence have not found commercial application. While increasing the porosity of the outer electrode area, it is still necessary however to have good electrical contact between the active material and the substrate.

The object of this present invention is to provide a high quality and low cost electrode that overcomes the limitations of current state-of-the-art pocket and/or sintered iron electrodes. Specifically, the invention describes a paste style iron electrode utilizing a single conductive substrate to enable a high capacity iron electrode for use in rechargeable battery system including, but not limited to, Ni—Fe, Ag—Fe, Fe-air, or $MnO_2$—Fe. It is a further goal of this invention to provide a paste style electrode with regions having different porosity and/or composition to improve active material utilization, discharge and charge rate, and gas migration from the electrode.

SUMMARY OF THE INVENTION

The present invention provides one with a novel coated iron electrode. Provided is an iron based electrode comprising a single layer conductive substrate coated on at least one side with a multilayered coating, with each coating layer comprising an iron active material and preferably a binder. The coating is comprised of at least two layers. Each layer has at least a different porosity or composition than an adjacent layer. The iron based electrode is useful in alkaline rechargeable batteries, particularly as a negative electrode in a Ni—Fe battery.

Among other factors, it has been discovered that a multilayer coated iron electrode can provide desirable advantages. The different layers can be different in various physical characteristics or in composition. The physical characteristics can in include porosity. With layers of different porosity, for example, improved flow of gases from the active material to the electrolyte can be achieved. Different additives can be added to the coating composition of each different layer to also provide focused and effective results in the operation of the iron electrode.

DETAILED DESCRIPTION OF THE INVENTION

Figure 1:
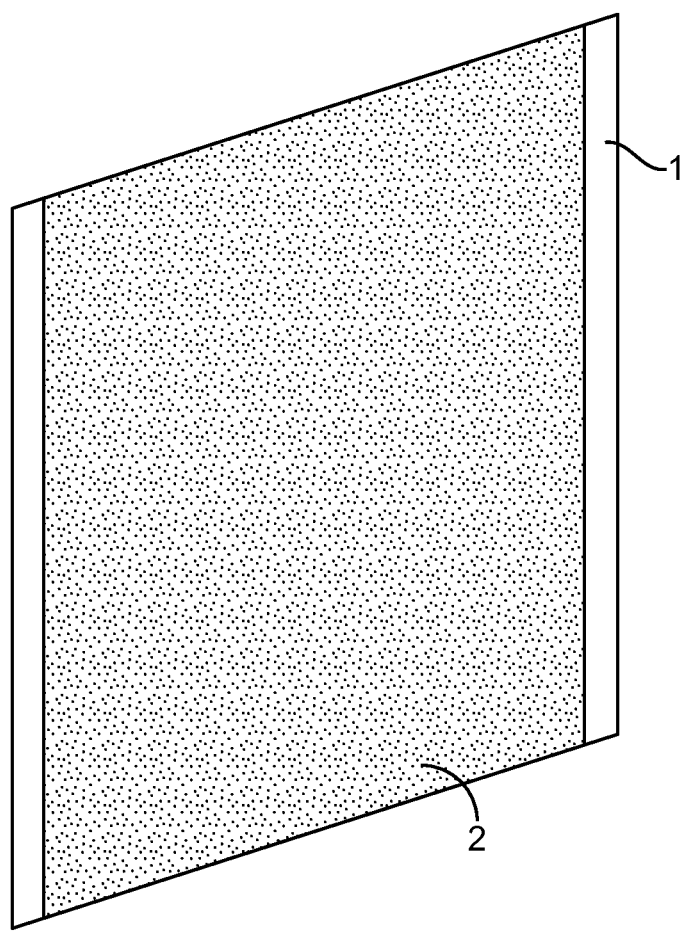
FIG. 1 is a perspective view of a coated iron electrode of the present invention.

The invention comprises an iron electrode comprised of a multilayered coating on a single conductive substrate. The coating is comprised of two or more layers. Each layer of the coating has a different porosity and/or composition than an adjacent layer. Layering may be accomplished by applying successive coating mixtures to the conductive substrate. Between each coating application, the electrode is dried and may be calendared to a desired thickness. Variation of porosity in each layer may be achieved by applying varying pressure to the coating mixture during application, inclusion of pore formers, composition of the coating mixture, and varying the calendaring thickness after coating. The composition of the layers is determined by the composition of the coating mixture.

The coating method of the invention is conducive to layering of various materials and providing layers of different properties, such as porosities, densities, and thicknesses. For example, the substrate can be coated with three layers; the first layer being of high density, second layer of medium density, and final layer of a lower density to create a density gradient. This gradient improves the flow of gases from the active material to the electrolyte and provides better electrolyte contact and ionic diffusion with the active material throughout the structure of the electrode. Outer layers may have high porosity and surface area to improve active material utilization and rate capability. Surface and outer layers may contain additives that increase the hydrogen overpotential and additives such as sulfur that help reduce early passivation of the electrode. Highly dense inner layers improve electrical connectivity to the substrate.

Each coating mixture is a combination of binder and active materials in an aqueous or organic solution. The mixture can also contain other additives such as pore formers or conductive additives such as carbon, graphite, or Ni powder. Pore formers can be incorporated to enhance electrode porosity. The binder materials have properties that provide adhesion and bonding between the active material particles, both to themselves and to the substrate current collector. The binder is generally resistant to degradation due to aging, temperature, and caustic environment. The binder can comprise polymers, alcohols, rubbers, and other materials, such as an advanced latex formulation that has been proven effective. A polyvinyl alcohol binder is used in one embodiment. Use of a binder to mechanically adhere the active material to the supporting single substrate eliminates the need for expensive sintering or electrochemical post-treatment.

In the present invention, a single layer substrate is used. This single layer acts as a carrier with coated material bonded to at least one side. The substrate may be a thin conductive material such as perforated metal foil or sheet, metal mesh or screen, woven metal, or expanded metal. The substrate may also be a three-dimensional material such as a metal foam or metal felt. In one embodiment, a nickel plated perforated foil has been used.

The active material for the mix formulation is selected from iron species that can be reversibly oxidized and reduced. Such materials include iron metal and iron oxides and iron hydroxide materials which will convert to iron metal when a charge is applied. A suitable iron oxide material includes $Fe_3O_4$. Additives that may be included in the mix formation are sulfur, antimony, selenium, and tellurium and iron compounds of these elements such as iron sulfide. Other additives that may be used include materials that increase the hydrogen reduction overpotential such as bismuth, tin, mercury, and lead and compounds of these elements such as bismuth sulfide. Additives may be used alone or in combination with iron active materials in a mix formulation.

A further advantage of the electrode of invention is that additives can be combined into the paste formula since electrode processing is done at relatively low temperatures. Use of a sintered construction as described in the prior literature precludes addition of additives such as sulfur to the active mass since they would be lost during the sintering process.

The coating method can be a continuous process that applies the active material mixture to the substrate, such as spraying, dip and wipe, extrusion, low pressure coating die, or surface transfer. A low pressure coating die is used in one embodiment. A batch process may also be used, but a continuous process is advantageous regarding cost and processing. The coating method must maintain a high consistency for weight, thickness, and coating uniformity. This insures that finished electrodes will have similar loadings of active material to provide uniform capacity in the finished battery product.

After each coating, the electrode is dried to remove any residual liquid, i.e., aqueous or organic solvent. The drying methods will generally provide a continuous method for liquid removal from the coated active material which will enhance the adhesion and binding effects of the dry constituents without iron ignition. This drying method provides a uniform and stable active material coating with the substrate material. Two stages of drying can be used. For example, the first stage can be radiation for bulk drying, for cost and quality control, followed by convection drying to remove the remaining liquid. The radiation used can be any radiation, such as infrared, microwave, or UV, and is very fast. In one embodiment, IR radiation is used. However, the radiation creates a high temperature at the surface of the coated electrode. This high temperature is acceptable as long as there is sufficient water present to act as a heat sink. Therefore, the water is generally removed to about 10-20% by weight water. This can generally be determined using a control chart. Going below 10% water is dangerous, as the electrode becomes too dry and the high surface temperature can ignite the iron active material. Thus, using the convection drying to complete the removal of water or solvent is a preferred embodiment, once the amount of water remaining is in the 10-20% by weight range. In another embodiment, radiation can be used to compete the drying if the process is conducted in an inert atmosphere.

The compaction methods will be accomplished by rolling mill, vertical pressing, and magnetic compaction of the active material to achieve the desired thickness from 0.005 to 0.50 inches and porosities from 10% to 50%, for high quality and low cost continuous processing. In one embodiment, the porosity of the electrode is from 15-25% porosity. These compaction methods can be used in conjunction with the layering method described above for providing material properties of density, thickness, porosity, and mechanical adhesion at each layer.

In addition, continuous in-line surface treatments can be applied continuously throughout any of the steps, including coating, layering, and drying processes. The treatments can apply sulfur, polymer, metal spray, surface laminate, etc. In one embodiment, a polymer post-coat is applied.

The iron electrode can be used with a suitable positive electrode (cathode) to make a battery, e.g., a Ni—Fe battery with a nickel cathode and the iron electrode of this invention. The battery can be made as is conventional, with a standard electrolyte and battery separator. The electrolyte, for example, can be a potassium hydroxide based electrolyte.

The present batteries including the iron electrode can be used, for example, in a cellphone, thereby requiring an electrode with only a single side coated. However, both sides are preferably coated, allowing the battery to be used in many applications as is known in the art.

Figure 2:
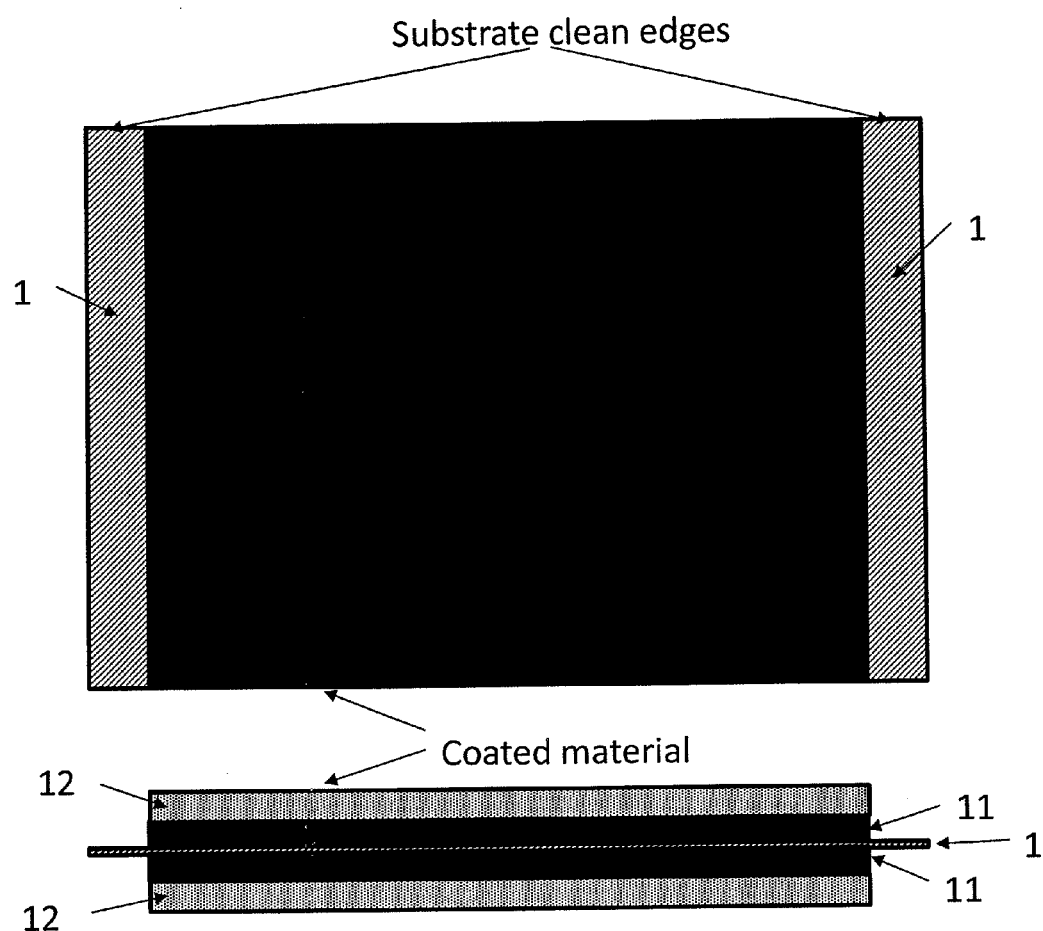
FIG. 2 is a side view and cross-section view of a layered iron electrode coated on both sides of the substrate in accordance with the present invention.

Turning to the figures of the drawing, FIG. 1 is a prospective view of a coated iron electrode. The substrate 1 is coated on each side with coating 2 comprising various coating layers each of which comprises the iron active material, binder, and/or additives. This is further shown in FIG. 2. The substrate 1 is coated on each side with the inner coating 11 and outer coating 12. The substrate may be coated continuously across the surface of the substrate, or preferably, as shown in FIGS. 1 and 2, cleared lanes of substrate may be uncoated to simplify subsequent operations such as welding of current collector tabs. In the present invention, the coating comprises at least two layers. Each layer of the coating has a different porosity and/or composition than an adjacent layer. With layers of different porosity, improved flow of gases from the iron active material to the electrolyte can be achieved. The different compositions can be achieved by using different additives in different layers to provide focused and effective results in the operation of the iron electrode.

The layering can be accomplished by applying successive coating mixtures to the conductive substrate. Between each coating application, the electrode can be dried can be calendared to a desired thickness. Variation of porosity in each layer can be achieved, for example, by applying varying pressure during application, inclusion of pore formers, and varying the calendaring thickness after coating.

Figure 3:
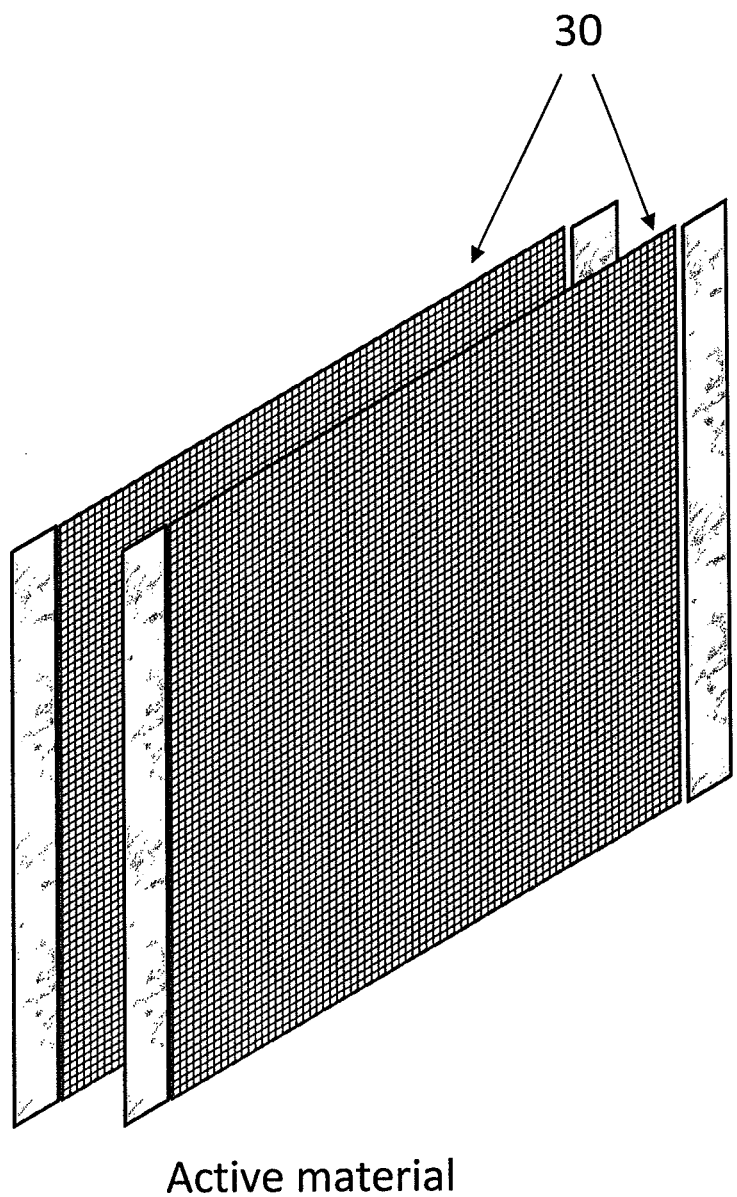
FIG. 3 is a perspective view of a current pocket iron electrode.
Figure 4:
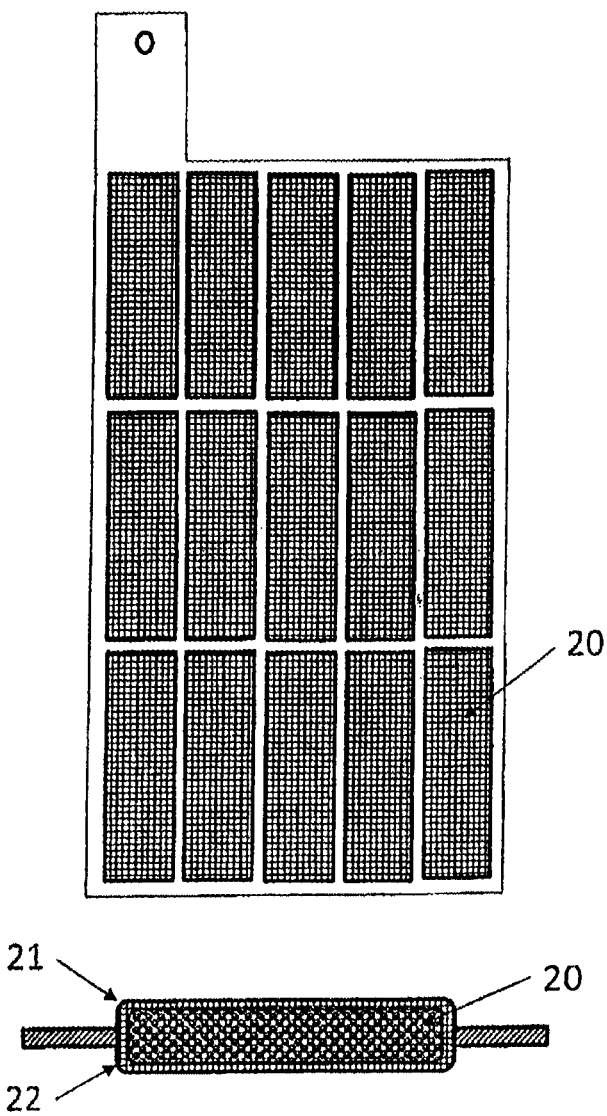
FIG. 4 is a side view and a cross-section view of a current pocket iron electrode.

FIGS. 3 and 4 of the drawing show a conventional pocket iron electrode. In FIG. 3, the two substrates 30 are shown to form the pocket which holds the iron active material. In FIG. 4, the iron active material 40 is held between the two substrates 41 and 42.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An iron electrode which comprises a single layer of a conductive substrate coated on at least one side with a coating comprising an iron active material, with the coating comprising at least two layers.

2. The iron electrode of claim 1, wherein the coating comprises two layers.

3. The iron electrode of claim 2, wherein the two layers have different porosities.

4. The iron electrode of claim 2, wherein the two layers have different compositions.

5. The iron electrode of claim 1, wherein the coating comprises three layers.

6. The iron electrode of claim 5, wherein at least two of the three layers have different porosities.

7. The iron electrode of claim 5, wherein at least two of the three layers have different compositions.

8. The iron electrode of claim 1, wherein each coating layer also comprises a binder.

9. The electrode of claim 8, wherein the binder comprises polyvinyl alcohol.

10. The iron electrode of claim 1, wherein at least one of the coating layers comprises a pore former.

11. The electrode of claim 1, wherein the iron active material comprises an iron metal or iron oxide species.

12. The electrode of claim 1, wherein at least one coating layer on at least one side comprises a sulfur, antimony, selenium, and tellurium additive, or mixture thereof.

13. The electrode of claim 1, wherein the layered coating is on both sides of the substrate.

14. The electrode of claim 1, wherein the substrate is a metal foil, metal sheet, metal foam, metal mesh, woven metal, or expanded metal.

15. The electrode of claim 1, wherein the porosity of at least one layer of the coating of the electrode is in the range of about 10-50%.

16. The electrode of claim 1, wherein each layer of coating comprising an iron active material further comprises a polyvinyl alcohol binder and sulfur.

17. A battery comprising a nickel based cathode and the electrode of claim 1 as the anode.

18. A method for preparing the electrode of claim 1, which comprises preparing at least two coating mixtures of an iron active material, and successively coating at least one side of a substrate with the coating mixtures to create different layers of coating.

19. The method of claim 18, wherein both sides of the substrate are coated.

20. The method of claim 18, wherein the coating of both sides of the substrate is continuous.

21. The method of claim 18, wherein the different layers have different properties.

22. The method of claim 18, wherein there are three different coating layers coated on the substrate.

23. The method of claim 18, wherein each layer is of a different density.

24. The method of claim 18, wherein each coating mixture of an iron active material further comprises a polyvinyl alcohol binder and sulfur.

* * * * *